(12) United States Patent
Kakishima et al.

(10) Patent No.: US 12,317,098 B2
(45) Date of Patent: May 27, 2025

(54) TERMINAL, METHOD, BASE STATION, AND SYSTEM FOR CONTROLLING SRS TRANSMISSION

(71) Applicant: NTT DOCOMO, INC., Tokyo (JP)

(72) Inventors: Yuichi Kakishima, Tokyo (JP); Yuki Matsumura, Tokyo (JP); Takayuki Furuta, Tokyo (JP); Yuta Oguma, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 527 days.

(21) Appl. No.: 17/311,292

(22) PCT Filed: Dec. 6, 2018

(86) PCT No.: PCT/JP2018/044980
§ 371 (c)(1),
(2) Date: Jun. 4, 2021

(87) PCT Pub. No.: WO2020/115877
PCT Pub. Date: Jun. 11, 2020

(65) Prior Publication Data
US 2022/0022053 A1 Jan. 20, 2022

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0617* (2013.01); *H04B 7/086* (2013.01);
(Continued)

(58) Field of Classification Search
CPC ... H04W 16/28; H04W 56/001; H04W 88/02; H04B 7/0617; H04B 7/086; H04B 7/088;
(Continued)

(56) References Cited

U.S. PATENT DOCUMENTS

2018/0227035 A1* 8/2018 Cheng ................. H04B 7/0626
2020/0235802 A1* 7/2020 Nilsson ............... H04L 25/0226
(Continued)

OTHER PUBLICATIONS

RP-182606, Apple Inc., "Finalizing the beam correspondence feature", 3GPP TSG RAN Meeting #82, Sorrento, Italy, Dec. 10-13, 2018 (Year: 2018).*
(Continued)

*Primary Examiner* — Gary Mui
*Assistant Examiner* — Yewon Kim
(74) *Attorney, Agent, or Firm* — Osha Bergman Watanabe & Burton LLP

(57) ABSTRACT

A user terminal according to one aspect of the present disclosure includes: a transmitting section that transmits information that indicates which beam correspondence that uses which downlink reference signal is supported; a receiving section that receives spatial relation information that indicates a downlink reference signal having a spatial relation with a sounding reference signal; and a control section that determines a spatial domain filter used to transmit an uplink signal, based on a spatial domain filter used to receive the downlink reference signal.

4 Claims, 9 Drawing Sheets

(51) Int. Cl.
  *H04B 7/08* (2006.01)
  *H04L 5/00* (2006.01)
  *H04W 56/00* (2009.01)
(52) U.S. Cl.
  CPC ........... *H04B 7/088* (2013.01); *H04L 5/0051* (2013.01); *H04W 56/001* (2013.01)
(58) Field of Classification Search
  CPC .................. H04B 7/0695; H04B 7/06966; H04B 7/0628; H04B 7/0408; H04L 5/0051; H04L 5/0023; H04L 5/005; H04L 5/0048
  See application file for complete search history.

(56) References Cited

U.S. PATENT DOCUMENTS

2021/0152397 A1* 5/2021 Jiang ..................... H04L 5/0048
2021/0399855 A1* 12/2021 Davydov .............. H04L 5/0023
2022/0015118 A1* 1/2022 Park .................... H04W 72/046

OTHER PUBLICATIONS

3GPP TS 38.214 V15.3.0; "3rd Generation Partnership Project; Technical Specification Group Radio Access Network; NR; Physical layer procedures for data (Release 15)"; Sep. 2018 (Year: 2018).*
RP-182580, Nokia et al., "UE support for NR Beam Correspondence", 3GPP TSG RAN Meeting #82, Sorrento, Italy, Dec. 10-13, 2018 (Year: 2018).*
3GPP TS 38.331 V15.3.0; "3rd Generation Partnership Project; Technical Specification Group Radio Access Network; NR; Radio Resource Control (RRC) protocol specification (Release 15)"; Sep. 2018 (Year: 2018).*
Partial Supplementary European Search Report issued in counterpart European Patent Application No. 18942280.1, mailed on Jun. 21, 2022 (19 pages).
Sony; "Summary of SRS"; 3GPP TSG RAN WG1 Ad Hoc-1801 Meeting, R1-1801085; Vancouver, CA, Jan. 22-26, 2018 (53 pages).
Nokia, Nokia Shanghai Bell; "UE support for NR Beam Correspondence"; 3GPP TSG RAN Meeting #82, RP-182580; Sorrento, Italy, Dec. 10-13, 2018 (5 pages).
International Search Report issued in PCT/JP2018/044980 on Feb. 26, 2019 (2 pages).
Written Opinion of the International Searching Authority issued in PCT/JP2018/044980 on Feb. 26, 2019 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).
Office Action issued in Korean Application No. 10-2021-7019262 mailed on Nov. 24, 2022 (8 pages).
Office Action issued in the counterpart Japanese Patent Application No. 2020-558764, mailed on Sep. 20, 2022 (8 pages).
Extended European Search Report issued in counterpart European Patent Application No. 18942280.1, mailed on Sep. 22, 2022 (16 pages).
Office Action issued in Korean Application No. 10-2021-7019262 mailed on Jun. 21, 2023 (8 pages).
Office Action issued in Chinese Application No. 201880100655.2 mailed on Jun. 7, 2023 (12 pages).
RAN WG4; "Draft LS on the beam correspondence requirement and multi-band applicability framework for FR2 power class 3 UEs"; 3GPP TSG-RAN WG4 Meeting #89, R4-1816747; Spokane, USA, Nov. 12-16, 2018 (2 pages).
Office Action issued in the counterpart Chinese Application No. 201880100655.2, mailed Oct. 26, 2023 (14 pages).

* cited by examiner

TERMINAL, METHOD, BASE STATION, AND SYSTEM FOR CONTROLLING SRS TRANSMISSION

TECHNICAL FIELD

The present disclosure relates to a user terminal of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+(plus), New Radio (NR) or 3GPP Rel. 15 or subsequent releases) are also studied.

In legacy LTE systems (e.g., LTE Rel. 8 to 14), a user terminal (UE: User Equipment) transmits an uplink signal. The uplink signal may include at least one of, for example, a random access channel (Physical Random Access Channel (PRACH)), an uplink shared channel (Physical Uplink Shared Channel (PUSCH)), an uplink control channel (Physical Uplink Control Channel (PUCCH)), a Sounding Reference Signal (SRS), a Demodulation Reference Signal (DM-RS) of the PUSCH or the PUCCH.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied that a UE performs Beam Management (BM) in a future radio communication system (e.g., NR). More specifically, BM is also studied where a certain node uses a Beam Correspondence (BC) for determining a transmission beam (transmission spatial domain filter) used to transmit a signal based on a reception beam (reception spatial domain filter) used to receive the signal.

It is studied for, for example, BC-based uplink BM that a UE determines a transmission beam (transmission spatial domain filter) of an uplink signal based on a downlink reference signal (e.g., a Synchronization Signal Block (SSB) or a Channel State Information Reference Signal (CSI-RS)).

However, when a network (e.g., base station) does not recognize a downlink reference signal for a BC supported by the UE, there is a risk that it is not possible to appropriately control BC-based uplink BM.

It is therefore one of objects of the present disclosure to provide a user terminal that can appropriately control BC-based BM.

Solution to Problem

A user terminal according to one aspect of the present disclosure includes: a transmitting section that transmits information that indicates which beam correspondence that uses which downlink reference signal is supported; a receiving section that receives spatial relation information that indicates a downlink reference signal having a spatial relation with a sounding reference signal; and a control section that determines a spatial domain filter used to transmit an uplink signal, based on a spatial domain filter used to receive the downlink reference signal.

Advantageous Effects of Invention

According to one aspect of the present disclosure, it is possible to appropriately control BC-based BM.

DESCRIPTION OF EMBODIMENTS (Beam Management)

Figure 1A:
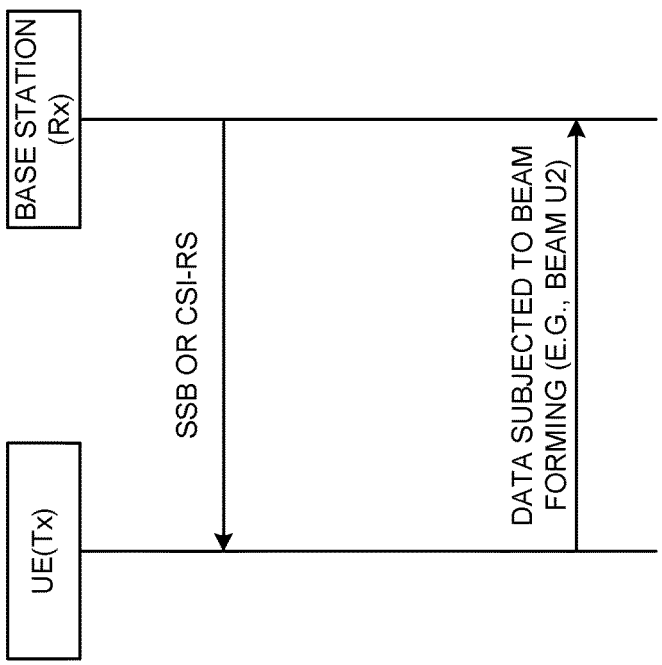
FIGS. 1A to 1C are diagrams illustrating one examples of uplink BM.

Beam Management (BM) for an uplink signal is studied for NR. More specifically, BM (also referred to as, for example, first BM, BM without (wo) a BC or non-BC-based BM) that does not assume that there is a Beam Correspondence (BC), and BM (also referred to as, for example, second BM, BM with (w) a BC or BC-based BM) that assumes that there is a beam correspondence are studied for NR.

In this regard, a beam correspondence may be, for example, capability of a certain node (e.g., a base station or a UE) for determining a beam (a reception beam or an Rx beam) used to receive a signal, and determining a beam (a transmission beam or a Tx beam) used to transmit the signal based on the determined Rx beam.

For example, it may be said that, when at least one of following conditions is satisfied, the base station has a beam correspondence:

The base station can determine an Rx beam used to receive an uplink signal, based on a UE's measurement result of a downlink signal transmitted by one or more Tx beams from the base station.

The base station can determine a Tx beam used to transmit a downlink signal based on a measurement result of an uplink signal received by one or more Rx beams at the base station.

For example, it may be said that, when at least one of following conditions is satisfied, the UE has a beam correspondence:

The UE can determine a Tx beam used to transmit an uplink signal based on a measurement result of a downlink signal received by one or more Rx beams in the UE.

The UE can determine an Rx beam used to receive a downlink signal based on an indication of a TRP based on a measurement result of an uplink signal transmitted by one or more Tx beams from the UE.

A capability indication from the UE related to the beam correspondence is supported.

In addition, the beam correspondence may be referred to as a transmission/reception beam correspondence (Tx/Rx beam correspondence), beam reciprocity, beam calibration, calibrated/non-calibrated, reciprocity calibrated/non-calibrated, a correspondence degree or a match degree.

According to non-BC-based BM, a reception apparatus (Rx apparatus) (e.g., the base station on uplink and the UE on downlink) determines a Tx beam used for transmission from a transmission apparatus (Tx apparatus) (e.g., the UE on uplink and the base station on downlink) based on measurement results of one or more signals (e.g., uplink reference signals or downlink reference signals) from the transmission apparatus, and transmits information (e.g., beam index) indicating the Tx beam to the transmission apparatus. The transmission apparatus may transmit a signal (e.g., an uplink signal or a downlink signal) by using the Tx beam indicated by the reception apparatus.

According to BC-based BM, the transmission apparatus (Tx apparatus) (e.g., the UE on uplink and the base station on downlink) may determine a Tx beam based on a signal (e.g., a downlink reference signal or an uplink reference signal) from the reception apparatus (Rx apparatus) (e.g., the base station on uplink and the UE on downlink), and transmit a signal (e.g., an uplink signal or a downlink signal) by using the determined Tx beam.

Figure 1B:
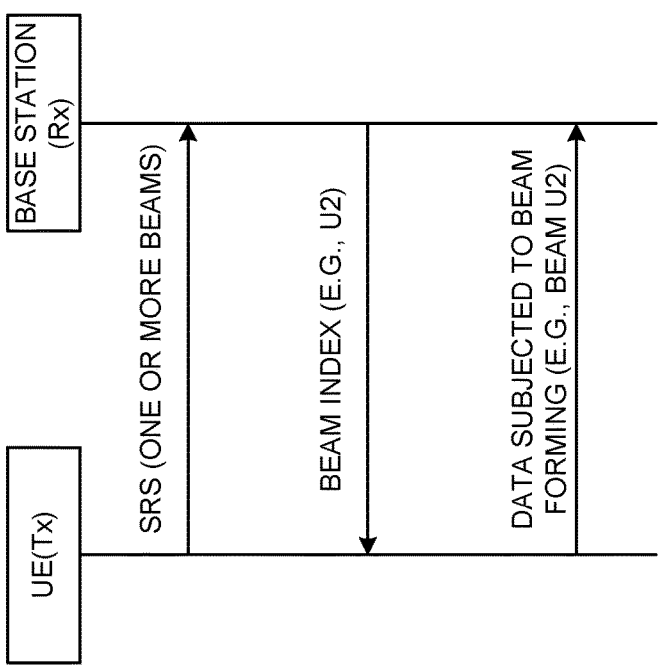

FIGS. 1A and 1B are diagrams illustrating one examples of uplink BM. FIG. 1A illustrates the one example of non-BC-based uplink BM. FIG. 1B illustrates the one example of BC-based uplink BM. In addition, in FIGS. 1A and 1B, a base station transmits a downlink signal or receives an uplink signal by using beams B1 to B4, and a UE receives the downlink signal or transmits the uplink signal by using beams U1 and U2 (see FIG. 1C). In this regard, transmission beams and reception beams in respective nodes do not necessarily match. Furthermore, FIGS. 1A and 1B assume that the beam B3 and the beam U2 are a Beam Pair Link (BPL).

Figure 1C:
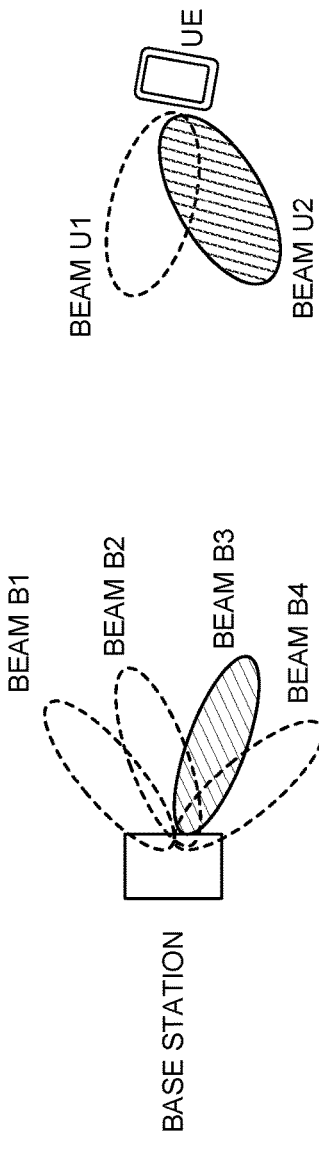

As illustrated in FIG. 1A, according to non-BC-based BM, the UE (Tx) transmits an uplink reference signal (e.g., SRS) by using one or more beams (e.g., the beams U1 and U2 in FIG. 1C). The UE may transmit one or more beams in different time domains by using beam sweep.

For example, the UE may receive information (e.g., an SRS Resource Indicator (SRI) or an SRS resource ID list) that indicates resources for one or more SRSs (SRS resources), and transmit an uplink signal (e.g., at least one of an uplink channel such as an SRS, a PUSCH or a PUCCH and another uplink physical signal) by using beams associated with the SRS resources.

The base station (Rx) determines a Tx beam used for transmission from the UE (Tx) based on a measurement result of a received reference signal (e.g., SRS), and transmits information (e.g., beam index) that indicates the Tx beam to the UE.

In a case of, for example, FIG. 1C, the base station may decide that a measurement result of the beam U2 (or an SRS resource of an SRI associated with the beam U2) has been the best, and then transmit information related to the beam U2 to the UE. The information related to the beam U2 may be a Beam Index (BI) of the beam U2, or may be information (e.g., an SRI or an SRS resource ID) that indicates the SRS resource associated with the beam U2.

The UE may determine a Tx beam (e.g., the beam U2 in FIG. 1C) based on information (e.g., the above BI, SRI or SRS resource ID) indicated by the base station, and transmit an uplink signal (e.g., at least one of a PRACH, a PUSCH, a PUCCH, an SRS or a DM-RS) by using the determined Tx beam.

Thus, according to non-BC-based BM, the base station may determine a Tx beam from the UE based on a measurement result obtained by using resources (e.g., SRS resources on uplink) for one or more uplink reference signals configured to the UE, and indicate the Tx beam to the UE. Consequently, the UE can transmit an uplink signal by using the appropriate Tx beam.

On the other hand, as illustrated in FIG. 1B, according to BC-based BM, a Tx beam of the UE may be determined based on a downlink reference signal received (or detected) by the UE without measuring an uplink reference signal (e.g., SRS) in the base station (Rx).

More specifically, in FIG. 1B, the base station may transmit configuration information (e.g., an Information Element (IE) "SRS-Config" of RRC) for SRS transmission to the UE in advance. SRS-Config may include information related to one or more SRS resources. SRS-Config may include information related to one or more sets (SRS resource sets) each including the information related to the one or more SRS resources.

The information related to the SRS resources may include at least ones of, for example, SRS resource IDs, the number of ports (e.g., 1, 2 or 4) of the SRS resources, positions (e.g., the number of symbols or a starting symbol) in a time domain and a frequency domain of the SRS resources, SRS resource types (e.g., aperiodic, semi-persistent or periodic), and spatial relation information of the SRS resources (e.g., an IE "spatialRelationInfo" or "SRS-SpatialRelationInfo" of RRC).

In this regard, the spatial relation information may indicate a spatial relation between an SRS that is mapped on the SRS resource, and a reference signal (reference RS). The reference RS may be at least one of, for example, a Synchronization Signal Block (SSB), a Channel State Information-Reference Signal (CSI-RS) and an SRS, or may be configured by enhancing or changing at least one of these SSB, CSI-RS and SRS.

The SSB is a block including at least one of a Synchronization Signal (SS) and a broadcast channel (Physical Broadcast Channel (PBCH)), and is also referred to as, for example, an SS/PBCH block. The synchronization signal may include at least one of a Primary Synchronization Signal (PSS) and a Secondary Synchronization Signal (SSS).

For example, according to a type of the reference RS that has the spatial relation with an SRS, the spatial relation information may include (indicate) information related to an SSB (e.g., SSB index), information related to a CSI-RS (e.g., CSI-RS index or a non-zero power CSI-RS resource ID), or information related to the SRS (e.g., an SRS resource ID and an uplink Bandwidth Part (BWP) ID). In this regard, that the spatial relation information indicates the SSB or the CSI-RS may indicate BC-based, and that the spatial relation information indicates the SRS may indicate non-BC-based.

In addition, the spatial relation may be paraphrased as, for example, a relation of Quasi-Co-Location (QCL) (QCL relation). QCL is an index that indicates a statistical property of at least one of a signal and a channel (signal/channel). Furthermore, this information may be notified as a Transmission Configuration Indication (or a Transmission Configuration Information (TCI)) or a state of the TCI (TCI state) from an NW.

When, for example, a certain signal/channel and another signal/channel have a QCL relation, the QCL relation may mean that it is possible to assume that at least one of a doppler shift, a doppler spread, an average delay, a delay spread and a spatial parameter (e.g., spatial reception parameter (spatial Rx parameter)) is identical (the QCL holds for at least one of these parameters) between a plurality of these different signals/channels.

A plurality of types of QCL (QCL types) may be specified. For example, four QCL types A to D whose parameters (or parameter sets) that can be assumed identical are different may be provided, and the parameters are as follows:

QCL type A: doppler shift, doppler spread, average delay and delay spread.
QCL type B: doppler shift and doppler spread.
QCL type C: average delay and doppler shift.
QCL type D: spatial reception parameter.

In FIG. 1B, the BS may transmit the SSB or the CSI-RS configured based on the above spatial relation information.

The UE may determine an Rx beam of the SSB or the CSI-RS, and transmit an uplink signal (e.g., at least one of a PRACH, a PUSCH, a PUCCH, an SRS and a DMRS) by using a Tx beam (e.g., the same beam U2 as the Rx beam in FIG. 1C) in the same direction as that of the Rx beam.

More specifically, the UE may determine to use a Tx beam associated with an SRS resource that indicates a spatial relation with the received or detected DL-RS based on the above-described spatial relation information to transmit an uplink signal.

When spatial relation information related to an SSB or a CSI-RS and the SRS of a certain SRS resource is configured to the UE, the UE may transmit the certain SRS resource by using the same spatial domain filter as a spatial domain filter for receiving the SSB or the CSI-RS. That is, in this case, the UE may assume or expect that a UE reception beam of the SSB or the CSI-RS and a UE transmission beam of the SRS are the same.

In addition, the spatial domain filter for transmission from a base station, a downlink spatial domain transmission filter and a transmission beam of the base station may be interchangeably read. The spatial domain filter for reception at the base station, an uplink spatial domain receive filter and a reception beam of the base station may be interchangeably read.

Furthermore, the spatial domain filter for transmission from the UE, an uplink spatial domain transmission filter and a transmission beam of the UE may be interchangeably read. The spatial domain filter for reception at the UE, a downlink spatial domain receive filter and a reception beam of the UE may be interchangeably read.

Thus, according to BC-based uplink BM, the UE can determine a spatial domain filter to be applied to an uplink signal based on a downlink reference signal (a CSI-RS or an SSB) indicated by spatial relation information.

By the way, according to BC-based uplink BM, the following is studied with regard to the downlink reference signal:

In a case where UE's support of the CSI-RS for a BC is mandatory, the UE is requested to separately satisfy requirements for a BC in both of a case where the UE supports only an SSB and a case where the UE supports only the CSI-RS.

In a case where UE's support of the CSI-RS for a BC is optional or mandatory, the UE is requested to separately satisfy the requirement for a BC in one of the case where the UE supports only the SSB and the case where the UE supports only the CSI-RS.

However, a mismatch of recognition between the UE and the network (e.g., base station) regarding which BC that uses which downlink reference single the UE supports results in a risk that it is not possible to appropriately control BC-based uplink BM. Similarly, a mismatch of recognition regarding which BC that uses which uplink reference signal the UE supports results in a risk that it is not possible to appropriately control BC-based downlink BM.

Hence, the inventors of the present disclosure have conceived appropriately controlling BC-based BM by defining a new signaling for reporting which BC that uses which reference signal the UE supports, or making it possible to derive which BC that uses which reference signal the UE supports without the new signaling.

An embodiment according to the present disclosure will be described in detail below with reference to the drawings. A configuration described in each aspect may be each applied alone, or may be applied in combination.

Furthermore, "a downlink reference signal indicated by spatial relation information", "a downlink reference signal determined based on spatial relation information", "a downlink reference signal identified based on an index (or an ID) indicated by spatial relation information", "a downlink reference signal resource identified based on an index (or an ID) indicated by spatial relation information", and "a downlink reference signal transmitted by using a resource identified based on an index (or an ID) indicated by spatial relation information" may be interchangeably read below.

Furthermore, the downlink reference signal is assumed as an SSB or a CSI-RS, yet is not limited to these. The downlink reference signal resource is assumed as an SSB or CSI-RS resource (e.g., non-zero power CSI-RS resource), yet is not limited to this.

Furthermore, for example, "an SRS", "an SRS resource", "an SRS resource ID", "an SRS resource specified based on an SRS resource ID", "an SRS transmitted by using an SRS resource specified based on an SRS resource ID" may be interchangeably read.

Furthermore, the uplink signal is assumed as at least one of, for example, a PRACH, a PUSCH, a PUCCH, an SRS and a DMRS, yet is not limited to these.

(First Aspect)

According to the first aspect, a UE may transmit (report or give notification of) information (BC support information) related to which BC that uses which reference signal the UE supports to a base station. The BC support information may be included in, for example, UE capability information (e.g., an IE "UE-capability" of RRC).

More specifically, the UE may independently give notification of whether or not the UE supports a BC that uses an SSB and (or) whether or not the UE supports a BC that uses a CSI-RS. That is, the UE may give notification of whether or not the UE supports each downlink reference signal used for a BC.

In this case, the above BC support information (e.g., 2 bits) may include, for example, information (e.g., 1 bit) that indicates whether or not a BC that uses the SSB is supported, and information (e.g., 1 bit) that indicates whether or not a BC that uses the CSI-RS is supported.

Alternatively, the UE may selectively give notification of whether or not the UE supports a BC that uses the SSB or whether or not the UE supports a BC that uses the CSI-RS. That is, the UE may give notification of which BC that uses which downlink reference signal the UE supports on a precondition that one of types of downlink reference signals is used for a BC.

In this case, the above BC support information (e.g., 1 bit) may indicate which BC that uses which one of the SSB and the CSI-RS is supported. In this regard, the BC support information may be notified (may be included in the above UE capability information) only when one of the SSB and the CSI-RS is supported.

Figure 2:
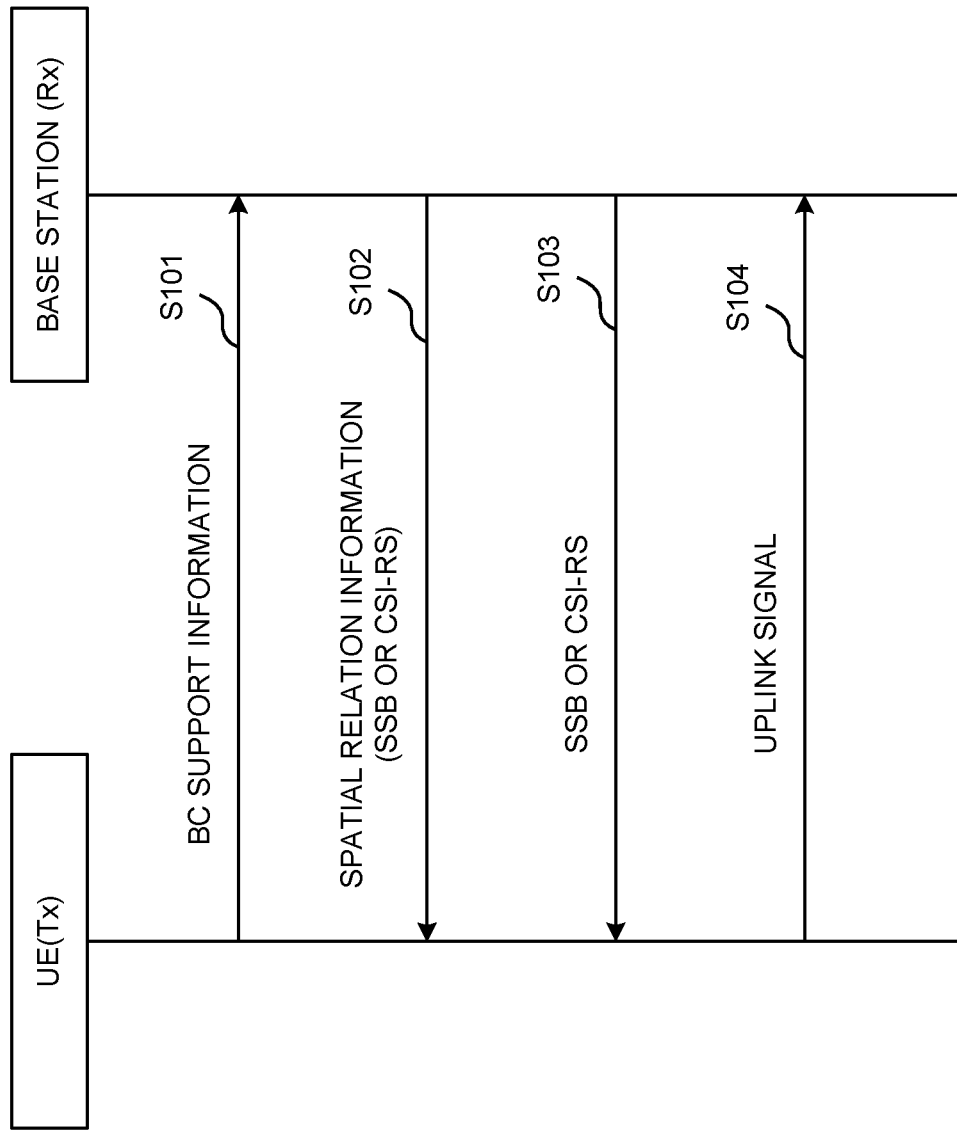
FIG. 2 is a diagram illustrating one example of BC-based uplink BM according to a first aspect.

FIG. 2 is a diagram illustrating one example of BC-based uplink BM according to the first aspect. As illustrated in FIG. 2, in step S101, the UE transmits the above BC support information to the base station.

In step S102, a network (e.g., base station) may determine a downlink reference signal used for a BC based on the BC support information from the UE, and generate spatial relation information that indicates the downlink reference signal as a reference RS that has the spatial relation with an SRS. When, for example, the UE gives notification of which BC that uses which downlink reference signal of the SSB or the CSI-RS the UE supports, the spatial relation information may include identification information (e.g., an SSB index, a CSI-RS index or a non-zero power CSI-RS resource ID) of (a resource for) the reference signal.

The UE may configure which downlink reference signal to use to perform a BC, based on the spatial relation information from the base station. Furthermore, the UE may configure the reference RS (the SSB or the CSI-RS) that has the spatial relation with the SRS. The reference RS may be referred to simply as a downlink reference signal.

In step S103, the base station transmits the downlink reference signal (the SSB or the CSI-RS) determined in step S102.

In step S104, the UE may determine a Tx beam based on an Rx beam used to receive the downlink reference signal (the SSB or the CSI-RS) transmitted in step S103, and transmit an uplink signal by using the Tx beam. More specifically, the UE may transmit the uplink signal by using a spatial domain filter associated with a spatial domain filter for receiving the reference signal.

According to the first aspect, the BC support information related to which Beam Correspondence (BC) that uses which reference signal is supported is explicitly notified to the network, so that the network can appropriately determine one of an SSB and a CSI-RS as the reference RS that has the spatial relation with an SRS indicated by the spatial relation information.

(Second Aspect) According to the second aspect, which BC that uses which downlink reference signal is supported may be defined in advance by a specification (first example), or may be determined based on a reference signal configuration (second example).

First Example

The specification may define that a UE supports at least one of a BC that uses an SSB and a BC that uses a CSI-RS (the UE's support is mandatory).

More specifically, the specification may define that the UE supports one of the BC that uses the SSB and the BC that uses the CSI-RS (the UE's support is mandatory).

Alternatively, the specification may define that the UE supports one of the BC that uses the SSB and the BC that uses both of the SSB and the CSI-RS (the UE's support is mandatory).

The UE may transmit information related to whether or not the UE supports the BC that uses the reference signal (at least one of the SSB and the CSI-RS) defined as mandatory to a base station. The information may be included in capability information of the UE. Furthermore, the UE may transmit information related to whether or not the UE supports a BC that uses a reference signal that is not mandatory to the base station. The information may be included in capability information of the UE.

Second Example

The UE may determine which BC that uses which downlink reference signal the UE supports (whether or not the UE's support is mandatory or whether or not the UE's support is optional) based on a configuration of the downlink reference signal (reference signal configuration) used for the BC. Furthermore, the UE may determine UE capability information based on the reference signal configuration.

The reference signal configuration may be at least one of, for example, a density at which the downlink reference signal is multiplexed, the number of ports of the downlink reference signal, a bandwidth on which the downlink reference signal is multiplexed, a time domain resource to be allocated to the downlink reference signal, and a frequency domain resource to be allocated to the downlink reference signal. The reference signal configuration may be configured to the UE by a higher layer signaling (e.g., RRC signaling).

When the configured reference signal configuration satisfies given conditions, the UE may determine to support a BC that uses the reference signal of the reference signal configuration (the UE's support is mandatory). The given conditions may be, for example, at least one of followings:
 The above density is equal to or more (larger) than a given value.
 The above number of ports is equal to or more (larger) than a given value.
 The above bandwidth is equal to or more (larger) than a given value.

For example, at least one of followings may be configured as a CSI-RS configuration to the UE by a higher layer signaling.
 A density (e.g., 0.5, 1 or 3) of a CSI-RS resource measured (multiplexed) in a given resource (e.g., 1 Physical Resource Block (PRB))
 The number of ports of the CSI-RS (e.g., 1 or 2 ports)
 A bandwidth (e.g., a wide band or a partial band (e.g., 4 PRBs)) in which the CSI-RS is transmitted (multiplexed)
 At least one of a time domain resource and a frequency domain resource to be allocated to the CSI-RS When, for example, the configured density of the CSI-RS resource is the given value (e.g., 3), the UE may determine to support the BC that uses the CSI-RS (the UE's support is mandatory). On the other hand, when the configured density of the CSI-RS resource is not the given value (e.g., 3), the UE may determine to support the BC that uses the SSB (the UE's support is mandatory).

Furthermore, when the configured number of ports of the CSI-RS is equal to or more than the given value (e.g., 2) or larger than the given value (e.g., 1), the UE may determine to support the BC that uses the CSI-RS (the UE's support is mandatory). On the other hand, when the configured number of ports of the CSI-RS is less than the given value (e.g., 2) or equal to or less than the given value (e.g., 1), the UE may determine to support the BC that uses the SSB (the UE's support is mandatory).

Furthermore, when the configured bandwidth of the CSI-RS is the given value (e.g., wide band), the UE may determine to support the BC that uses the CSI-RS (the UE's support is mandatory). On the other hand, when the configured bandwidth of the CSI-RS is not the given value (e.g., wide band) (i.e., partial band), the UE may determine to support the BC that uses the SSB (the UE's support is mandatory).

According to the second aspect, which BC that uses which downlink reference signal is supported is defined in advance by a specification, or determined based on the reference signal configuration, so that a network can appropriately determine one of an SSB and a CSI-RS as a reference RS that has a spatial relation with an SRS indicated by spatial relation information.

(Third Aspect)

The third aspect will describe an operation of a UE in a case where a downlink reference signal different from a downlink reference signal supported for a BC by the UE is indicated by above spatial relation information.

The UE may control transmission of an uplink signal that uses the BC based on presence/absence of another downlink reference signal (e.g., an SSB, a CSI-RS or a Tracking Reference Signal (TRS)) that has a QCL relation with the downlink reference signal (e.g., a CSI-RS or an SSB) indicated by the spatial relation information. In this regard, the TRS may employ a common physical channel configuration to that of the CSI-RS.

Figure 3:
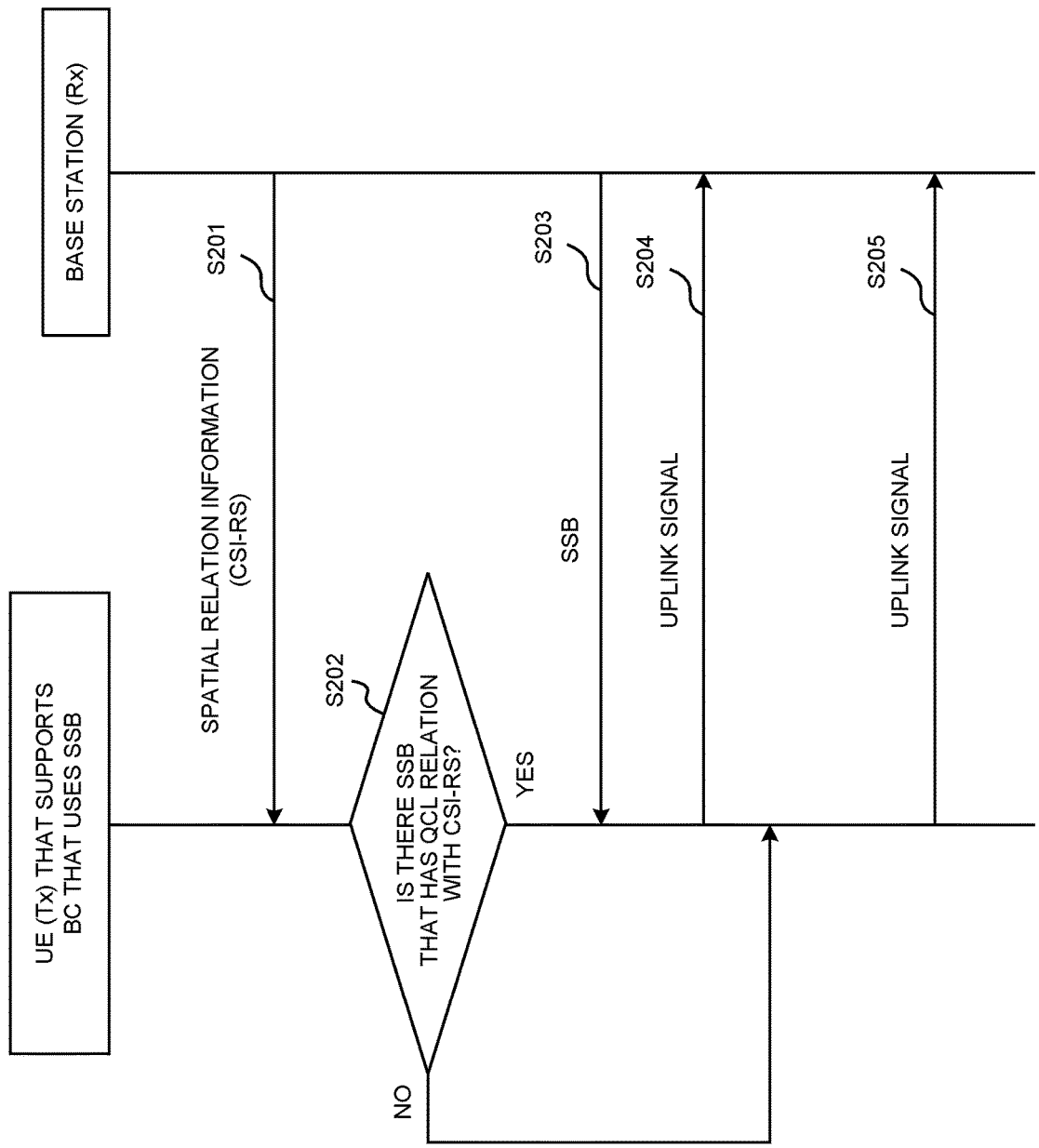
FIG. 3 is a diagram illustrating a first example of BC-based uplink BM according to a third aspect.

FIG. 3 is a diagram illustrating a first example of BC-based uplink BM according to the third aspect. In FIG. 3, the UE supports a BC that uses an SSB. As indicated in, for example, step S201, a base station transmits the spatial relation information that indicates the CSI-RS, to the UE that supports the BC that uses the SSB.

In step S202, the UE judges whether or not there is an SSB having a QCL relation with the CSI-RS (non-zero power CSI-RS resource) indicated by the spatial relation information. More specifically, the UE may receive in advance information (CSI-RS QCL information) that indicates at least one of a reference signal (e.g., the SSB or another CSI-RS resource) having a QCL relation with the non-zero power CSI-RS resource, and a QCL type.

The CSI-RS QCL information may be indicated by a state of a Transmission Configuration Indication (TCI) (TCI state). The UE may specify at least one of the downlink reference signal having the QCL relation with the CSI-RS indicated by the spatial relation information, and the QCL type based on a TCI state ID. The UE may determine whether or not there is an SSB having the QCL relation with the CSI-RS indicated by the above spatial relation information based on the CSI-RS QCL information.

When there is the SSB having the QCL relation with the CSI-RS resource indicated by the spatial relation information (step S202; Yes), the UE may assume that the CSI-RS resource is configured for the BC. Furthermore, the UE may determine a spatial domain filter by using the SSB having the QCL relation with the CSI-RS.

In step S203, the UE receives the SSB having the QCL relation with the CSI-RS. In step S204, the UE may transmit an uplink signal by using a spatial domain filter (e.g., identical spatial domain filter) determined based on the spatial domain filter used to receive the SSB. Alternatively, the UE may transmit the uplink signal by using the spatial domain filter (e.g., identical spatial domain filter) determined based on the spatial domain filter used to receive the CSI-RS that has been assumed to be configured in step S202.

When there is not the SSB having the QCL relation with the CSI-RS resource indicated by the spatial relation information (step S202; NO), the UE may operate according to one of following 1) to 3) in step S205.

1) The UE may assume to apply a spatial domain filter used to transmit a PRACH (e.g., last PRACH). The UE may transmit the uplink signal by using the spatial domain filter used to transmit the PRACH.

2) The UE may assume to apply the spatial domain filter used to receive an SSB (an SSB of an SSB index) selected at a time of transmission of the PRACH (e.g., last PRACH). The UE may transmit the uplink signal by using the spatial domain filter (e.g., identical spatial domain filter) determined based on a spatial domain filter used to receive the SSB.

3) The UE that supports the BC that uses the SSB may not assume that the spatial relation information that indicates the CSI-RS is configured.

Figure 4:
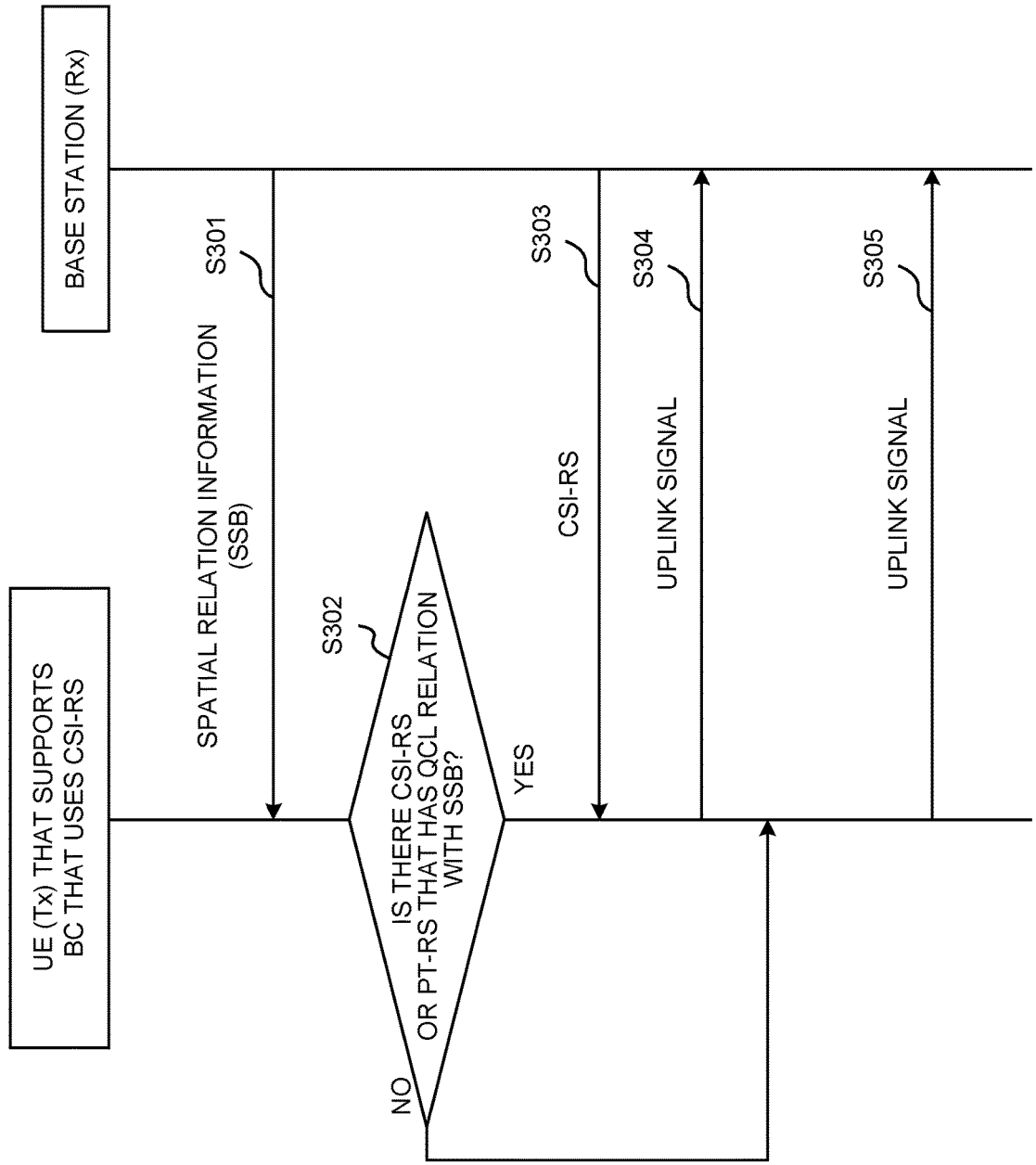
FIG. 4 is a diagram illustrating a second example of BC-based uplink BM according to the third aspect.

FIG. 4 is a diagram illustrating a second example of BC-based uplink BM according to the third aspect. FIG. 4 assumes that the UE supports a BC that uses a CSI-RS. For example, as indicated in step S301, the base station transmits spatial relation information that indicates an SSB to the UE that supports the BC that uses the CSI-RS.

In step S302, the UE judges whether or not there is a CSI-RS or a downlink TRS having a QCL relation with the SSB indicated by the spatial relation information.

When there is the CSI-RS or the downlink TRS associated with the SSB indicated by the spatial relation information (step S302; YES), the UE may assume that the CSI-RS or the downlink TRS resource is configured for the BC. The CSI-RS or the downlink TRS associated with the SSB may be a CSI-RS or a downlink TRS having a QCL relation of a QCL type D with the SSB.

In step S303, the UE receives the CSI-RS that has been assumed to be configured in step S302. In step S304, the UE may transmit an uplink signal (e.g., at least one of a PUSCH, a PUCCH, an SRS and a DMRS) by using a spatial domain filter (e.g., identical spatial domain filter) determined based on the spatial domain filter used to receive the CSI-RS.

When there is not the SSB having the QCL relation with the CSI-RS resource indicated by the spatial relation information (step S302; NO), the UE may operate according to one of following 1) to 3) in step S305.

1) The UE may assume to apply a spatial domain filter used to transmit a PRACH (e.g., last PRACH). The UE may transmit the uplink signal by using the spatial domain filter used to transmit the PRACH.

2) The UE may assume to apply the spatial domain filter used to receive an SSB selected at a time of transmission of the PRACH (e.g., last PRACH). The UE may transmit the uplink signal by using the spatial domain filter (e.g., identical spatial domain filter) determined based on a spatial domain filter used to receive the SSB.

3) The UE that supports the BC that uses the CSI-RS may not assume that the spatial relation information that indicates the SSB is configured.

In addition, the UE may control uplink BM by using a second reference signal having a QCL relation with a first reference signal indicated by the above spatial relation information. When, for example, the above spatial relation information indicates the SSB, the UE may control uplink BM by using the CSI-RS having the QCL relation with the SSB. On the other hand, when the above spatial relation information indicates the CSI-RS, the UE may control uplink BM by using the SSB having the QCL relation with the CSI-RS.

Furthermore, the UE may control uplink BM by using both of the first reference signal indicated by the above spatial relation information, and the second reference signal having the QCL relation with the first reference signal. When, for example, the above spatial relation information indicates one of the SSB and the CSI-RS, the UE may control uplink BM by using both of the SSB and the CSI-RS having the QCL relation with the SSB.

According to the third aspect, even when a downlink reference signal different from a downlink reference signal supported for a BC by the UE is indicated by the above spatial relation information, the UE can appropriately control transmission of an uplink signal that uses the BC. Furthermore, the UE can appropriately control transmission of the uplink signal based on the downlink reference signal indicated by the spatial relation information without reporting which BC that uses which downlink reference signal the UE supports to the base station (that is, without changing a capability signaling).

(Fourth Aspect) According to the fourth aspect, a UE may assume which reference signal spatial relation information indicates based on a feature supported by the UE.

The feature supported by the UE may be, for example, at least one of followings:
CSI-RS-based beam measurement.
A specific frequency band.
A specific beam report (e.g., at least one of a periodic beam report, an aperiodic beam report and a semi-persistent beam report).
A specific Frequency Range (FR) (e.g., an FR1 of 450 MHz to 6000 MHz or an FR 2 of 24250 MHz to 52600 MHz).

The UE may report capability information (UE capability) that indicates whether or not the UE supports the above feature to a base station. More specifically, the UE may assume which reference signal is configured for the BC by the spatial relation information by using at least one of following first to third conditions based on the above feature.

<First Condition>

The first condition may be that the UE reports that the UE supports CSI-RS-based beam measurement to the base station. When, for example, transmitting capability information that indicates that the UE supports the CSI-RS-based beam measurement to the base station, the UE may assume that the above spatial relation information indicates a CSI-RS.

On the other hand, when not transmitting the capability information to the base station, the UE may assume that the above spatial relation information indicates an SSB. The capability information may include a value larger than 0 as information related to the CSI-RS-based beam measurement (e.g., component 1a of feature 2-24 in the UE feature list of RAN 1).

<Second Condition>

The second condition may be that the UE reports that the UE supports a specific frequency band to the base station.

When, for example, transmitting the capability information that indicates that the UE supports the specific frequency band to the base station, the UE may assume that the above spatial relation information indicates the CSI-RS. The UE may assume that it has been tested that the UE supports at least the BC that uses the CSI-RS in the specific frequency band (that is, the UE has passed the RAN4 test).

On the other hand, when transmitting the capability information that indicates that the UE supports a frequency band other than the specific frequency band to the base station, the UE may assume that the above spatial relation information indicates the SSB. The UE may assume that it has been tested that the UE supports at least the BC that uses the SSB in the frequency band (that is, the UE has passed the RAN4 test).

<Third Condition>

The third condition may be that the UE reports that the UE supports a specific beam report to the base station.

When, for example, transmitting capability information that indicates that the UE supports the specific beam report to the base station, the UE may assume that the above spatial relation information indicates the CSI-RS. The specific beam report may be, for example, an aperiodic beam report. By reporting that the UE supports the aperiodic beam report, the UE may assume that it has been tested that the UE supports at least the BC that uses the CSI-RS (that is, the UE has passed the RAN4 test).

On the other hand, when transmitting the capability information that indicates that the UE supports a beam report other than the specific beam report to the base station, the UE may assume that the above spatial relation information indicates the SSB. The beam report may be, for example, a periodic beam report. By reporting that the UE supports the periodic beam report, the UE may assume that it has been tested that the UE supports at least the BC that uses the SSB (that is, the UE has passed the RAN4 test).

Figure 5:
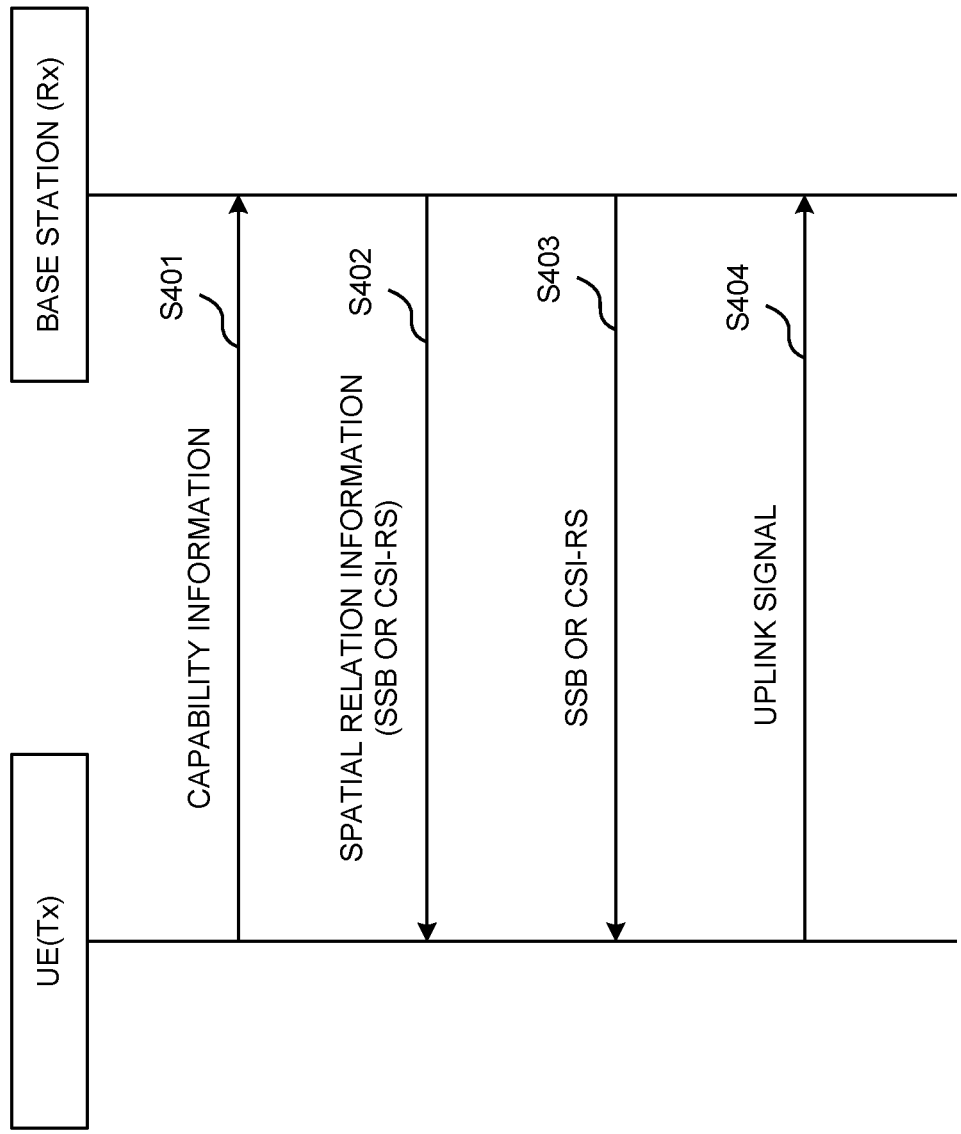
FIG. 5 is a diagram illustrating one example of BC-based uplink BM according to a fourth aspect.

FIG. 5 is a diagram illustrating one example of BC-based uplink BM according to the fourth aspect. As illustrated in FIG. 5, in step S401, the UE transmits the above capability information to the base station. The capability information may simply indicate whether or not the BC is supported, yet may not include above BC support information related to which BC that uses which downlink reference signal is supported.

In step S402, the UE may assume which downlink reference signal the spatial relation information indicates based on whether or not a feature supported by the above capability information satisfies a specific condition (e.g., at least one of first to third conditions).

In step S403, the base station transmits the downlink reference signal (the SSB or the CSI-RS) assumed in step S402. Step S404 is similar to, for example, step S104.

In addition, the fourth aspect has described the example above where the UE assumes that the spatial relation information indicates the CSI-RS in a case where the specific condition (e.g., at least one of the first to third conditions) is satisfied, and assume that the spatial relation information indicates the SSB in the other case. However, the fourth aspect is not limited to this, and these assumptions may be reverse. That is, the UE may assume that the spatial relation information indicates the SSB in the case where the specific condition (e.g., at least one of the first to third conditions) is satisfied, and assume that the spatial relation information indicates the CSI-RS in the other case.

According to the fourth aspect, the UE can recognize which reference signal the spatial relation information indicates based on other capability information to be reported to the base station without reporting which BC that uses which downlink reference signal the UE supports to the base station (that is, without changing a capability signaling).

<Other Aspect>

The above first to fourth aspects have described transmission control of an uplink signal that uses a BC, yet are applicable as appropriate to transmission control of a downlink signal (e.g., at least one of a downlink shared channel (Physical Downlink Shared Channel (PDSCH)), a downlink control channel (Physical Downlink Control Channel (PDCCH)) and a downlink reference signal) that uses a BC, too. In this case, an uplink signal/channel and a downlink signal/channel can be interchangeably read. Furthermore, uplink feedback information and a downlink control signaling can be interchangeably read. Furthermore, "uplink" and "downlink" in the above disclosure may be switched.

Furthermore, the above first to fourth aspects have been described on a precondition of a channel and a signaling scheme according to NR. However, the embodiment of the present invention is applicable to channels and signaling schemes having similar functions to those of NR. For example, the embodiment is applicable to LTE or LTE-A, too.

Furthermore, the above first to fourth aspects have described SSB-based and CSI-RS-based beam management. However, signals used for the beam management are not limited to the SSB and the CSI-RS. The signals may be, for example, a synchronization signal, other downlink reference signals (e.g., DM-RS), downlink channels (e.g., a PDCCH or a PDSCH), uplink reference signals (e.g., SRS), and physical uplink channels (e.g., a PUCCH or a PUSCH). Furthermore, these signals may be used not only for beam management, but also for, for example, uplink channel estimation, sounding and CSI measurement.

Furthermore, the CSI-RS used in the above first to fourth aspects may be notified as TRS-Info=on. TRS-Info=on may indicate that antenna ports for all non-zero power CSI-RS resources in a CSI-RS resource set are identical. Furthermore, the CSI-RS used in the above first to fourth aspects may be limited as repetition=on or off and notified.

Furthermore, the above first to fourth aspects have described various signaling examples. However, these signalings are not limited to explicit methods, and may be implicitly notified or may be uniquely defined by a specification. The various signaling examples have been described above. However, the embodiment is not limited to the above-described signalings. The signalings may use signalings of different layers such as RRC, a Medium Access Control Control Element (MAC Control Element (MAC CE)) and Downlink Control Information (DCI), may be one of a master information block and a system information block (SIB), or a combination of at least two of the blocks.

Furthermore, the above first to fourth aspects have used expressions such as a beam and beam forming. However, whether or not a signal/channel is subjected to beam forming may be transparent for at least one of a base station and a UE. The beam and the beam forming can be paraphrased simply as, for example, a signal or an RS. Furthermore, a reference signal subjected to beam forming may be read as a resource or a reference signal resource. Furthermore, the beam may be formed in antenna port units. Similarly, beam selection may be paraphrased as resource selection. Furthermore, a beam index may be paraphrased as a resource index or an antenna port index.

Furthermore, the above first to fourth aspects have mainly described transmission control of an uplink signal that uses a BC, yet are not limited to this, and are applicable as CSI measurement, channel sounding and beam management, and are applicable to link control such as other beam control.

(Radio Communication System)

The configuration of the radio communication system according to one embodiment of the present disclosure will be described below. This radio communication system uses one or a combination of the radio communication method according to each of the above embodiment of the present disclosure to perform communication.

Figure 6:
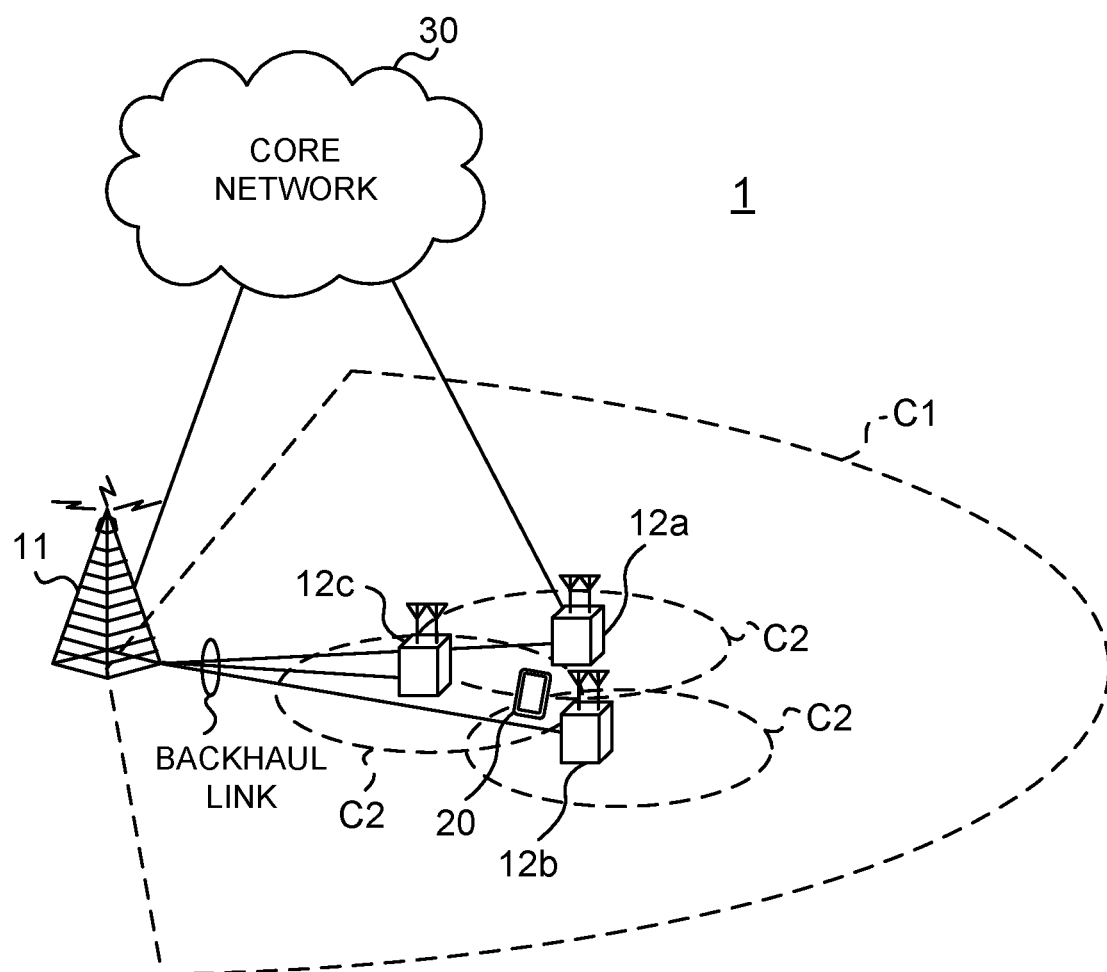
FIG. 6 is a diagram illustrating one example of a schematic configuration of a radio communication system according to one embodiment.

FIG. 6 is a diagram illustrating one example of a schematic configuration of the radio communication system according to the one embodiment. A radio communication system 1 may be a system that realizes communication by using Long Term Evolution (LTE), LTE-Advanced (LTE-A) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 includes a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 6. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR1)) and a second frequency range (Frequency Range 2 (FR2)). The macro cell C1 may be included in the FR1, and the small cell C2 may be included in the FR2. For example, the FR1 may be a frequency range equal to or less than 6 GHz (sub-6 GHz), and the FR2 may be a frequency range higher than 24 GHz (above-24 GHz). In addition, the frequency ranges and definitions of the FR1 and the FR2 are not limited to these, and, for example, the FR1 may correspond to a frequency range higher than the FR2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the another base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 uses an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

Figure 7:
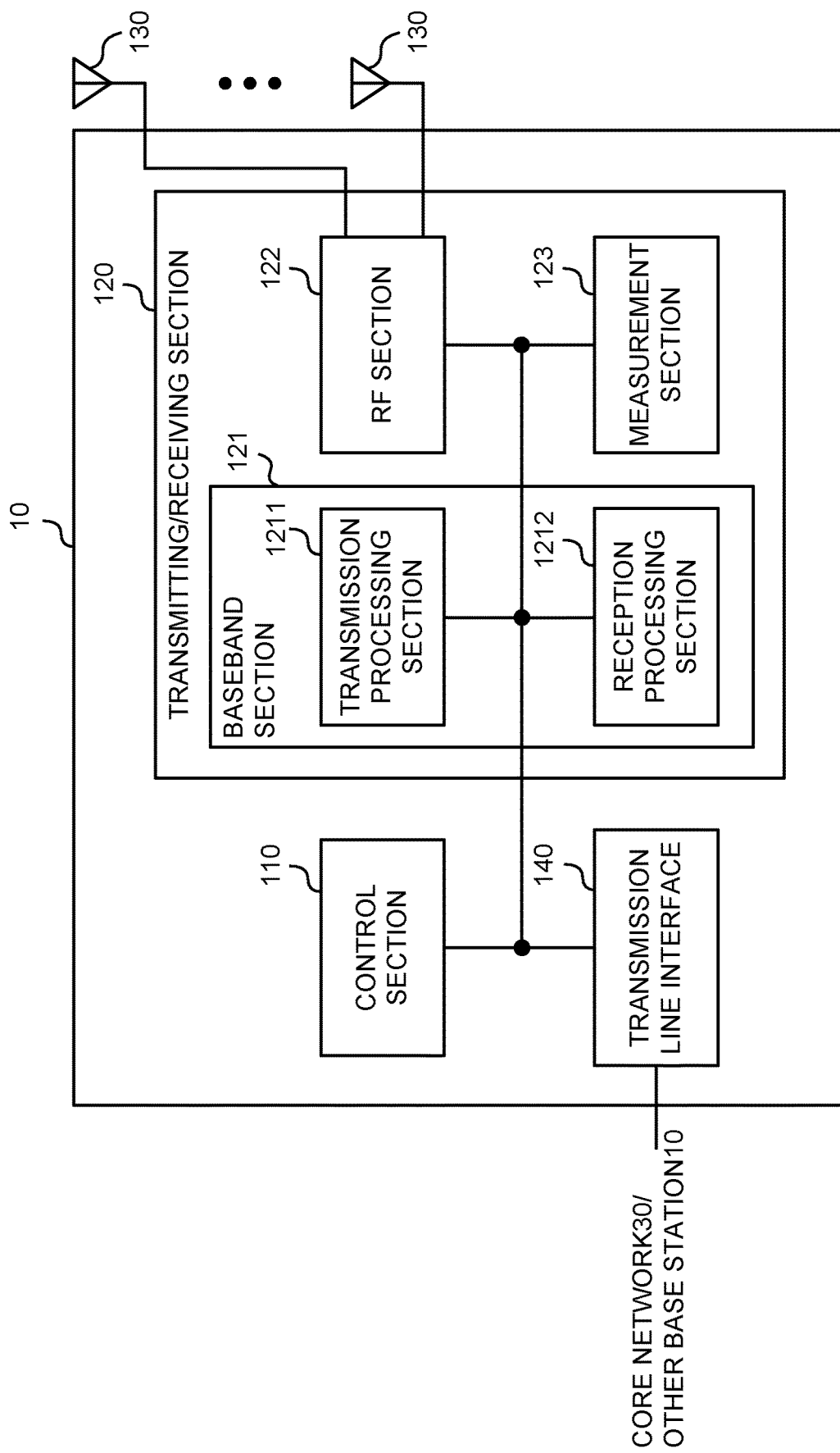
FIG. 7 is a diagram illustrating one example of a function configuration of the base station according to the one embodiment.

(Base Station) FIG. 7 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120, the transmission/reception antenna 130 and the transmission line interface 140.

In addition, the transmitting/receiving section 120 may receive information that indicates which beam correspondence that uses which downlink reference signal is supported. Furthermore, the transmitting/receiving section 120 may transmit spatial relation information that indicates a downlink reference signal having a spatial relation with a sounding reference signal. Furthermore, the control section 110 may determine a spatial domain filter used to transmit an uplink signal, based on a spatial domain filter used to receive the downlink reference signal.

The downlink reference signal may be at least one of a Synchronization Signal Block (SSB) and a Channel State Information Reference Signal (CSI-RS).

When a specification defines which beam correspondence that uses which downlink reference signal to indispensably support, the transmitting/receiving section 120 may receive the information.

The transmitting/receiving section 120 may transmit the spatial relation information that indicates the downlink reference signal having the spatial relation with the sounding reference signal. The control section 110 may determine whether or not to support a beam correspondence that uses the downlink reference signal based on a configuration of the downlink reference signal.

The transmitting/receiving section 120 may transmit the spatial relation information that indicates the downlink reference signal having the spatial relation with the sounding reference signal. The control section 110 may determine the spatial domain filter used to transmit the uplink signal, based on whether or not there is another downlink reference signal that has a quasi-co-location relation with the downlink reference signal.

The transmitting/receiving section 120 may receive capability information of the user terminal 20. The transmitting/receiving section 120 may transmit the spatial relation information. The control section 110 may assume that the spatial relation information indicates which downlink reference signal has the spatial relation with the sounding reference signal, based on whether or not the capability information indicates that a specific feature is supported.

(User Terminal)

Figure 8:
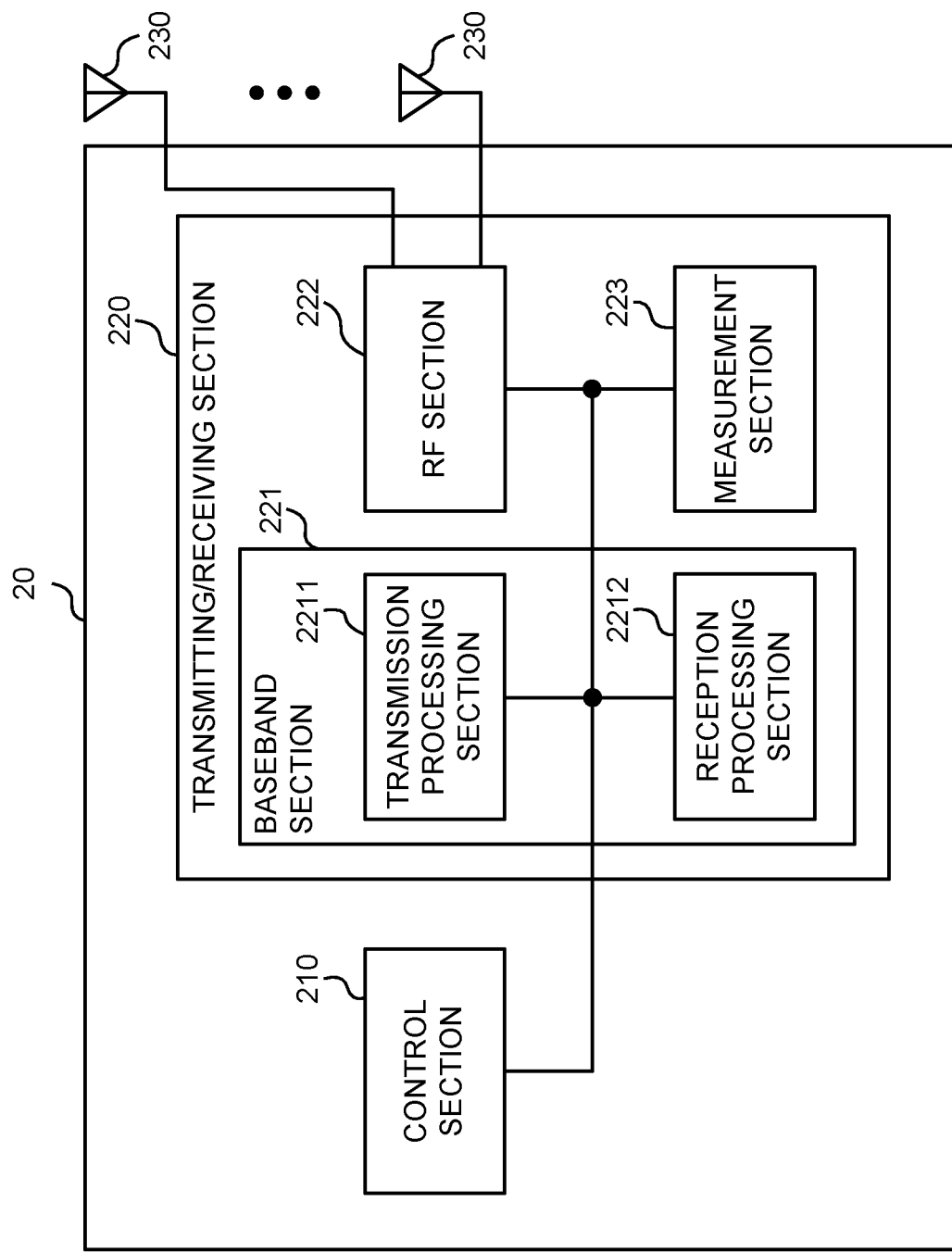
FIG. 8 is a diagram illustrating one example of a function configuration of the user terminal according to the one embodiment.

FIG. 8 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform RRM measurement or CSI measurement based on the received signal. The measurement section 223 may measure received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220, the transmission/reception antenna 230 and the transmission line interface 240.

In addition, the transmitting/receiving section 220 may transmit the information that indicates which beam correspondence that uses which downlink reference signal is supported. Furthermore, the transmitting/receiving section 220 may receive the spatial relation information that indicates the downlink reference signal having the spatial relation with the sounding reference signal. Furthermore, the control section 210 may determine a spatial domain filter used to transmit an uplink signal, based on a spatial domain filter used to receive the downlink reference signal.

The downlink reference signal may be at least one of a Synchronization Signal Block (SSB) and a Channel State Information Reference Signal (CSI-RS).

When the specification defines which beam correspondence that uses which downlink reference signal to indispensably support, the transmitting/receiving section 220 may transmit the information.

The transmitting/receiving section 220 may receive the spatial relation information that indicates the downlink reference signal having the spatial relation with the sounding reference signal. The control section 210 may determine whether or not to support the beam correspondence that uses the downlink reference signal based on the configuration of the downlink reference signal.

The transmitting/receiving section 220 may transmit the spatial relation information that indicates the downlink reference signal having the spatial relation with the sounding reference signal. The control section 210 may determine the spatial domain filter used to transmit the uplink signal, based on whether or not there is the another downlink reference signal that has the quasi-co-location relation with the downlink reference signal.

The transmitting/receiving section 220 may transmit the capability information of the user terminal 20. The transmitting/receiving section 120 may receive the spatial relation information. The control section 210 may assume that the spatial relation information indicates which downlink reference signal has the spatial relation with the sounding reference signal, based on whether or not the capability information indicates that the specific feature is supported.

(Hardware Configuration)

In addition, the block diagrams used to describe the above embodiment illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 9:
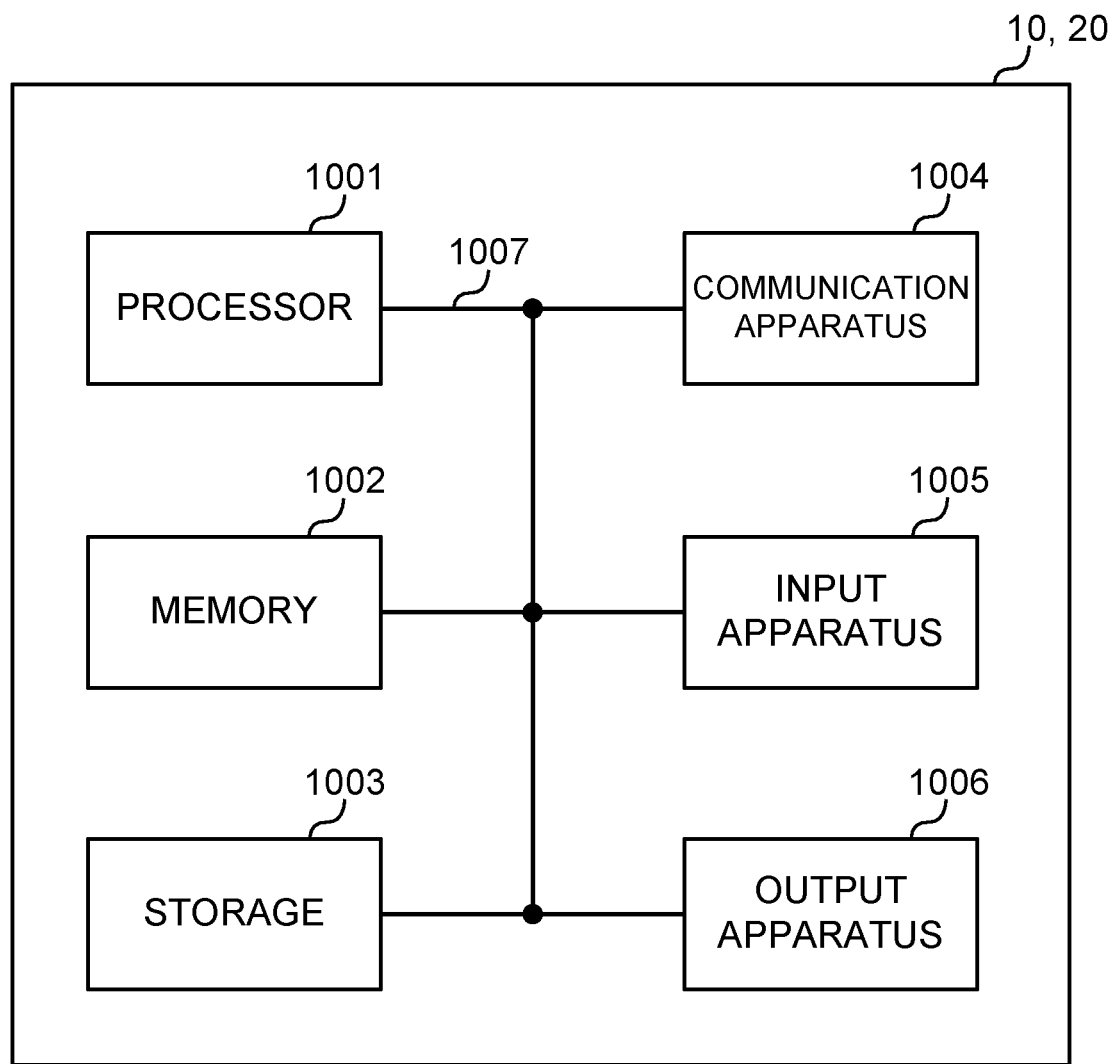
FIG. 9 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 9 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiment are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120a (220a) and a receiving section 120b (220b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL).

One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspects/ embodiment described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends to not be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
a transmitter that transmits, independently, first Radio Resource Control (RRC) information element indicating whether or not to support beam correspondence using a channel state information reference signal (CSI-RS) and second RRC information element indicating whether or not to support beam correspondence using a synchronization signal block (SSB);
a processor; and
a receiver that:
when the receiver receives spatial relation information generated based on the second RRC information element and indicating a spatial relation between sounding reference signal (SRS) and the SSB, the processor controls transmission of the SRS by using a same spatial domain transmission filter as a spatial domain transmission filter used for reception of the SSB, and
when the receiver receives spatial relation information generated based on the first RRC information element and indicating a spatial relation between the SRS and the CSI-RS, the processor controls transmission of the SRS by using a same spatial domain transmission filter as a spatial domain transmission filter used for reception of the CSI-RS.

2. A radio communication method for a terminal, comprising:

transmitting, independently, first Radio Resource Control (RRC) information element indicating whether or not to support beam correspondence using a channel state information reference signal (CSI-RS) and second RRC information element indicating whether or not to support beam correspondence using a synchronization signal block (SSB);
when receiving spatial relation information generated based on the second RRC information element and indicating a spatial relation between a sounding reference signal (SRS) and the SSB, controlling transmission of the SRS by using a same spatial domain transmission filter as a spatial domain transmission filter used for reception of the SSB; and
when receiving spatial relation information generated based on the first RRC information element and indicating a spatial relation between the SRS and the CSI-RS, controlling transmission of the SRS by using a same spatial domain transmission filter as a spatial domain transmission filter used for reception of the CSI-RS.

3. A base station comprising:
a receiver that receives, independently, first Radio Resource Control (RRC) information element indicating whether or not to support beam correspondence using a channel state information reference signal (CSI-RS) and second RRC information element indicating whether or not to support beam correspondence using a synchronization signal block (SSB);
a processor; and
a transmitter that:
when the transmitter transmits spatial relation information generated based on the second RRC information element and indicating a spatial relation between a sounding reference signal (SRS) and the SSB, the processor controls reception of the SRS transmitted, from a terminal, by using a same spatial domain transmission filter as a spatial domain transmission filter used for reception of the SSB, and
when the transmitter transmits spatial relation information generated based on the first RRC information element and indicating a spatial relation between the SRS and the CSI-RS, the processor controls reception of the SRS transmitted, from the terminal, by using a same spatial domain transmission filter as a spatial domain transmission filter used for reception of the CSI-RS.

4. A system comprising a terminal and a base station, wherein the terminal comprises:
a transmitter that transmits, independently, first Radio Resource Control (RRC) information element indicating whether or not to support beam correspondence using a channel state information reference signal (CSI-RS) and second RRC information element indicating whether or not to support beam correspondence using a synchronization signal block (SSB);
a processor; and
a receiver that:
when the receiver receives spatial relation information generated based on the second RRC information element and indicating a spatial relation between sounding reference signal (SRS) and the SSB, the processor of the terminal controls transmission of the SRS by using a same spatial domain transmission filter as a spatial domain transmission filter used for reception of the SSB, and when the receiver receives spatial relation information generated based on the first RRC information element and indicating a spatial relation between the SRS and the CSI-RS, the processor of the terminal controls transmission of the SRS by using a same spatial domain transmission filter as a spatial domain transmission filter used for reception of the CSI-RS, and the base station comprises:

a transmitter that transmits the spatial relation information; and a processor that controls reception of the first RRC information element, the second RRC information element, and the SRS.

* * * * *